(12) United States Patent
Kubota

(10) Patent No.: US 8,725,467 B2
(45) Date of Patent: May 13, 2014

(54) THREE-DIMENSIONAL MODEL PROCESSING TECHNIQUE

(75) Inventor: Tetsuyuki Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 103 days.

(21) Appl. No.: 13/220,291

(22) Filed: Aug. 29, 2011

(65) Prior Publication Data

US 2012/0059630 A1  Mar. 8, 2012

(30) Foreign Application Priority Data

Sep. 2, 2010 (JP) ................................. 2010-196451

(51) Int. Cl.
*G06F 17/50* (2006.01)
*G06T 19/20* (2011.01)
*G06T 17/20* (2006.01)

(52) U.S. Cl.
CPC ............ *G06T 19/20* (2013.01); *G06F 17/5018* (2013.01); *G06T 17/205* (2013.01)
USPC .................................. 703/1; 700/97; 700/98

(58) Field of Classification Search
CPC . G06F 17/50; G06F 17/5004; G06F 17/5018; G06T 17/00; G06T 17/205; G06T 19/00; G06T 19/20; G06T 15/08
USPC .......................................... 703/1; 700/97–98
See application file for complete search history.

(56) References Cited

U.S. PATENT DOCUMENTS

| 2008/0034023 A1* | 2/2008 | Nagano ......................... 708/100 |
| 2008/0165188 A1 | 7/2008 | Uraki |
| 2011/0093106 A1* | 4/2011 | Sinha et al. ..................... 700/98 |
| 2012/0278049 A1* | 11/2012 | Takashima ........................ 703/1 |

FOREIGN PATENT DOCUMENTS

| JP | 2002-189761 | 7/2002 |
| JP | 2004-118646 | 4/2004 |
| JP | 2006-72855 | 3/2006 |
| JP | 2007-233560 | 9/2007 |
| JP | 2008-171156 | 7/2008 |

OTHER PUBLICATIONS

Ponamgi et al., "Incremental Algorithms for Collision Detection Between Polygonal Models"., IEEE 1997, p. 51-64.*
Japanese Office Action mailed Dec. 3, 2013 in corresponding Japanese Application No. 2010-196451.

* cited by examiner

*Primary Examiner* — Eunhee Kim
(74) *Attorney, Agent, or Firm* — Staas & Halsey LLP

(57) ABSTRACT

This method includes: obtaining a first component having a hole among a plurality of components included in a three-dimensional model; determining whether a second component that satisfies a first condition that the second component has a portion that exists within the hole of the first component or a second condition that the second component covers at least a part of an opening portion of the hole included in the first component exists among the plurality of components included in the three-dimensional model; and upon determining that the second component exists, storing data for identifying the hole of the first component into a data storage unit.

6 Claims, 16 Drawing Sheets

THREE-DIMENSIONAL MODEL PROCESSING TECHNIQUE

CROSS-REFERENCE TO RELATED APPLICATIONS

This application is based upon and claims the benefit of priority of the prior Japanese Patent Application No. 2010-196451, filed on Sep. 2, 2010, the entire contents of which are incorporated herein by reference.

FIELD

This technique relates to a technique for processing a three-dimensional model.

BACKGROUND

Recently, the design verification by the numerical analysis using the Finite Element Method (FEM), Finite Volume Method (FVM) or the like has been spread. Generally, the three-dimensional model to be used for the numerical analysis is generated based on the three-dimensional model included in design data generated by the three-dimensional Computer Aided Design (CAD). However, the design data precisely represents a product shape. Therefore, when a mesh for the numerical analysis is generated from the shape of the three-dimensional model itself included in the design data, for example, it takes a long calculation time because an excessively detailed mesh is generated for the numerical analysis.

Therefore, there is a case where the shape of the design data is modified to generate a mesh suitable for the numerical analysis. For example, a technique exists in which a hole and/or round having a radius shorter than a designated radius is deleted. In other words, by deleting the holes and/or rounds that hardly affect the structure analysis of the product, vibration analysis, noise analysis and the like.

In addition, another technique exists in which, when a hole whose diameter or distance to an opposite side is not greater than twice the thickness of the spacial mesh is included in the component, the hole is buried by the FEM mesh.

For example, the number of holes for a large-scale information apparatus such a server is greater than several thousands. In order to cope with this, a support technique for modifying the three-dimensional model is desired. However, the size of the hole, which is used in the conventional technique, is one mere extraction condition based on a certain viewpoint.

SUMMARY

This three-dimensional model processing method includes: (A) obtaining a first component having a hole among a plurality of components included in a three-dimensional model; (B) determining whether a second component that satisfies a first condition that the second component has a portion that exists within the hole of the first component or a second condition that the second component covers at least a part of an opening portion of the hole included in the first component exists among the plurality of components included in the three-dimensional model; and (C) upon determining that the second component exists, storing data for identifying the hole of the first component into a data storage unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

As described in the column of the background art, a lot of holes whose size hardly affect results of the numerical analysis exist in the three-dimensional model included in the design data. Namely, not only holes having the opening but also a lot of holes that are buried by other component such as a screw and holes that are covered by other component exist within the three-dimensional model included in the design data. Then, there are holes among such holes, which do not largely affect the result of the numerical analysis. In this embodiment of this technique, covered holes are extracted from plural holes of plural components included in the three-dimensional model. Then, when a hole satisfies a predetermined condition, the component relating to the hole is modified.

Figure 1:
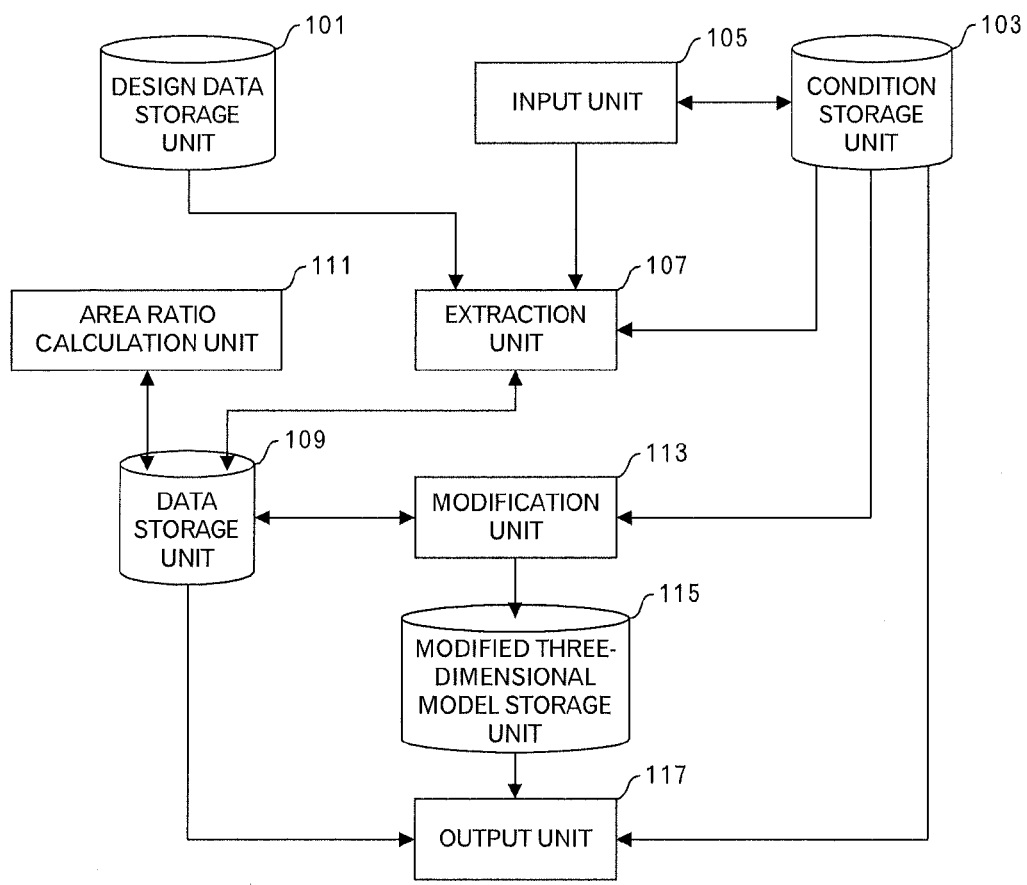
FIG. 1 is a functional block diagram of a three-dimensional model processing apparatus relating to an embodiment of this technique.

FIG. 1 depicts a functional block diagram of a three-dimensional model processing apparatus relating to this embodiment. The three-dimensional model processing apparatus has a design data storage unit 101 storing design data generated by the three-dimensional CAD, condition storage unit 103, input unit 105, extraction unit 107, data storage unit 109, area ratio calculation unit 111, modification unit 113, modified three-dimensional model storage unit 115 and output unit 117.

The input unit 105 accepts an input from a user to register an extraction condition of holes to be processed and the like into the condition storage unit 103, and outputs an instruction for causing the extraction unit 107 to start the processing to the extraction unit 107. In response to the instruction from the input unit 105, the extraction unit 107 extracts holes that are modification candidates by using data stored in the design data storage unit 101, condition storage unit 103 and data storage unit 109, and stores data for identifying holes and components and the like into the data storage unit 109. The area ratio calculation unit 111 calculates an area ratio of a covered portion of the hole to an opening portion of the hole by using data stored in the data storage unit 109, and stores the calculation results into the data storage unit 109. The modification unit 113 modifies the design data by using data stored in the condition storage unit 103 and data storage unit 109, and stores the modified three-dimensional model that is suitable for the numerical analysis into the modified three-dimensional model storage unit 115. The output unit 117 outputs data stored in the condition storage unit 103, data storage unit 109 and modified three-dimensional model storage unit 115.

Figure 2:
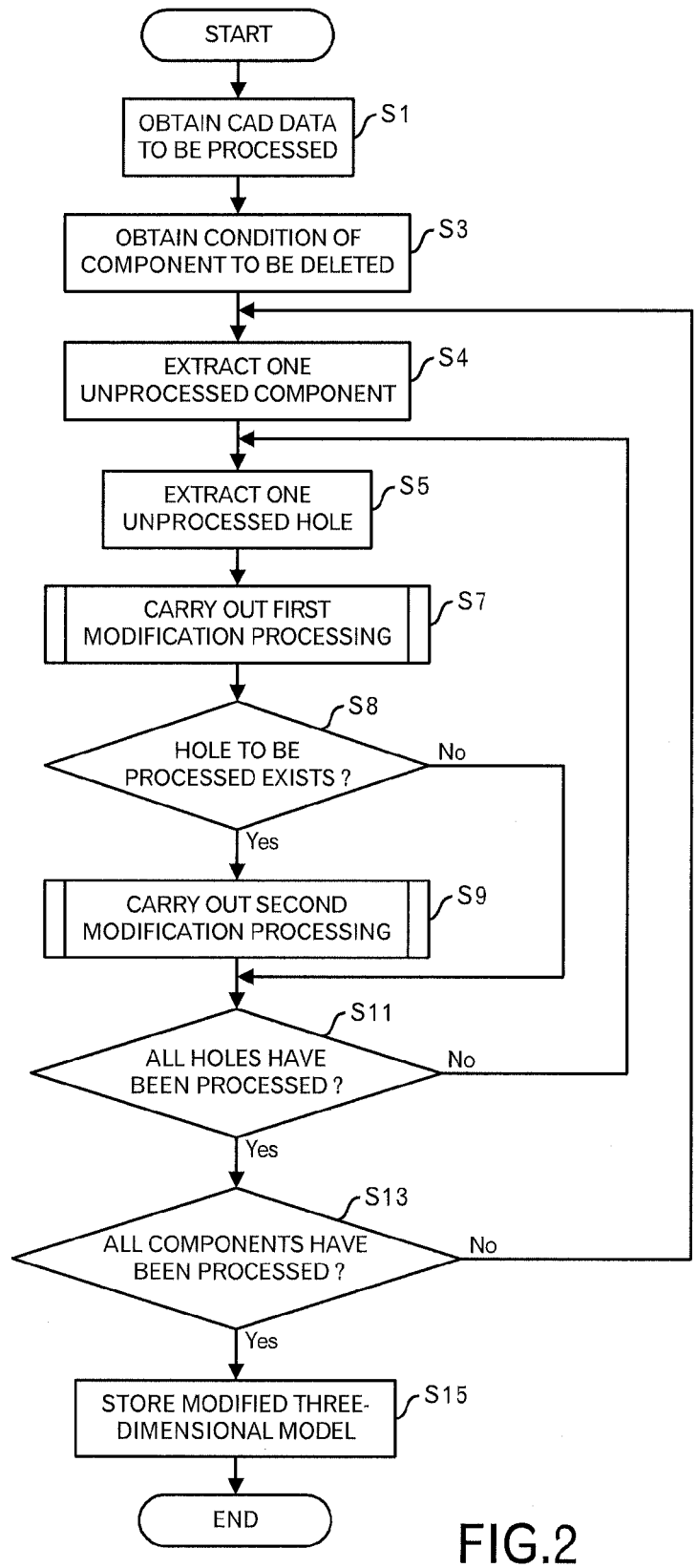
FIG. 2 is a diagram depicting a main processing flow.

Next, processing contents of the three-dimensional model processing apparatus depicted in FIG. 1 will be explained by using FIGS. 2 to 29. FIG. 2 illustrates a main processing flow. It is assumed that inputs from the user are accepted by the input unit 105 in advance and data used in the following processing is stored in the condition storage unit 103. Data stored in the condition storage unit 103 includes a condition of the hole to be extracted, condition of the component to be deleted, a reference area ratio that is a threshold value used for determining whether or not the hole is to be deleted, a parameter used for adjusting a detection range (expansion ratio, length to be extended and the like) and the like.

Figure 3A:
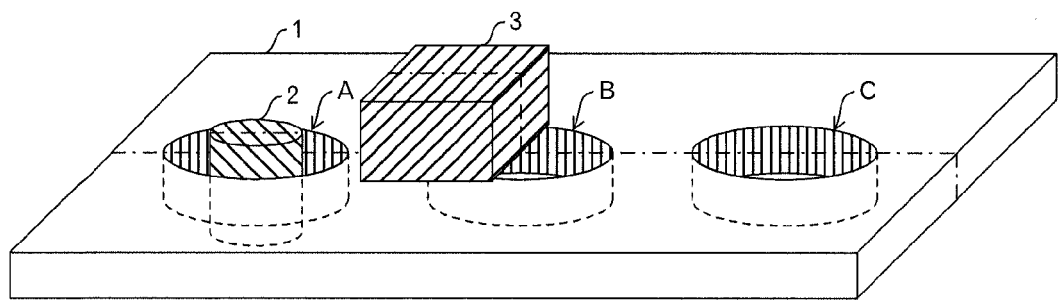
FIGS. 3A and 3B are perspective views depicting an example of a three-dimensional model included in design data.
Figure 3B:
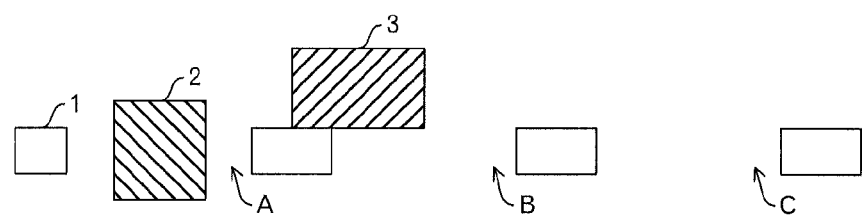

First, when the input unit 105 accepts a start instruction of the processing, in which the design data to be processed is designated, from the user, the input unit 105 outputs the start instruction to the extraction unit 107, and the extraction unit 107 obtains the design data to be processed from the design data storage unit 101 in response to the start instruction (FIG. 2: step S1). The obtained design data is stored into the data storage unit 109, for example. Here, the design data includes data of the three-dimensional model represented by a solid model, for example. FIG. 3A illustrates an example representing, as a perspective view, a three-dimensional model included in the design data. In FIG. 3A, a planar component 1 having plural holes A to C, a cylindrical component 2 and a rectangular parallelepiped component 3 are depicted. Moreover, FIG. 3B illustrates a cross section created by cutting the components by a plane passing through an alternate long and short dash line depicted in FIG. 3A. As depicted in FIG. 3B, the component 2 is placed so as to pass through the hole A, and the component 3 partially covers the hole B. As a specific example, it is assumed that the design data as depicted in FIGS. 3A and 3B is obtained at the step S1.

Then, the extraction unit 107 obtains a condition of the component to be deleted and condition of the hole to be extracted from the condition storage unit 103 (step S3). The condition of the component to be deleted is defined by any one or a combination of two or three elements among (1) a component name (e.g. screw) included in the data of the three-dimensional CAD, (2) a volume of the component, (3) the maximum outside dimension of the component and the like, for example. When the numerical analysis is carried out for the three-dimensional model, it is possible to reduce the processing amount, if it is possible to identify and delete components from which the influence to the analysis result is little. For example, when the numerical analysis of the air flow is carried out, the influence to the analysis result is little, even if components, which is smaller than a certain level, is deleted. Moreover, the condition of the hole to be extracted is defined like "a hole that is more shallow than a predetermined value", for example. This is a condition to be set in order to extract holes having a depth that hardly affect the analysis result of the numerical analysis.

Figure 5:
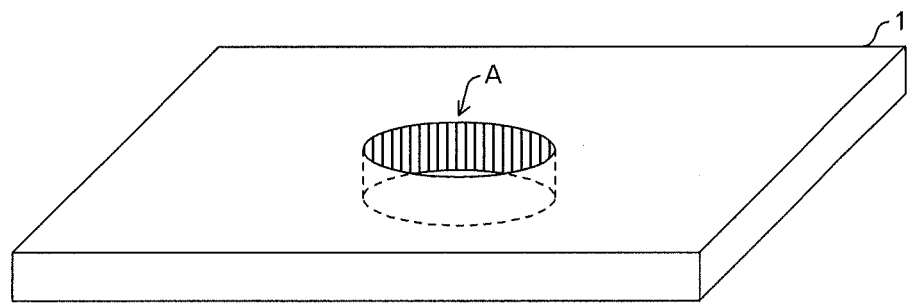
FIG. 5 is a perspective view depicting a hole included in the three-dimensional model.

After that, the extraction unit 107 identifies, as a processing target, one unprocessed component having a hole satisfying the condition obtained at the step S3 (step S4). Moreover, the extraction unit 107 identifies one unprocessed hole satisfying the condition obtained at the step S3 among holes included in the identified component (step S5). Here, it is assumed that the hole A as depicted in FIG. 5 was identified. Incidentally, the hole is detected as a shape having a cylindrical side whose front surface faces the inside, for example. Then, the extraction unit 107 carries out a first modification processing (step S7).

Figure 4:
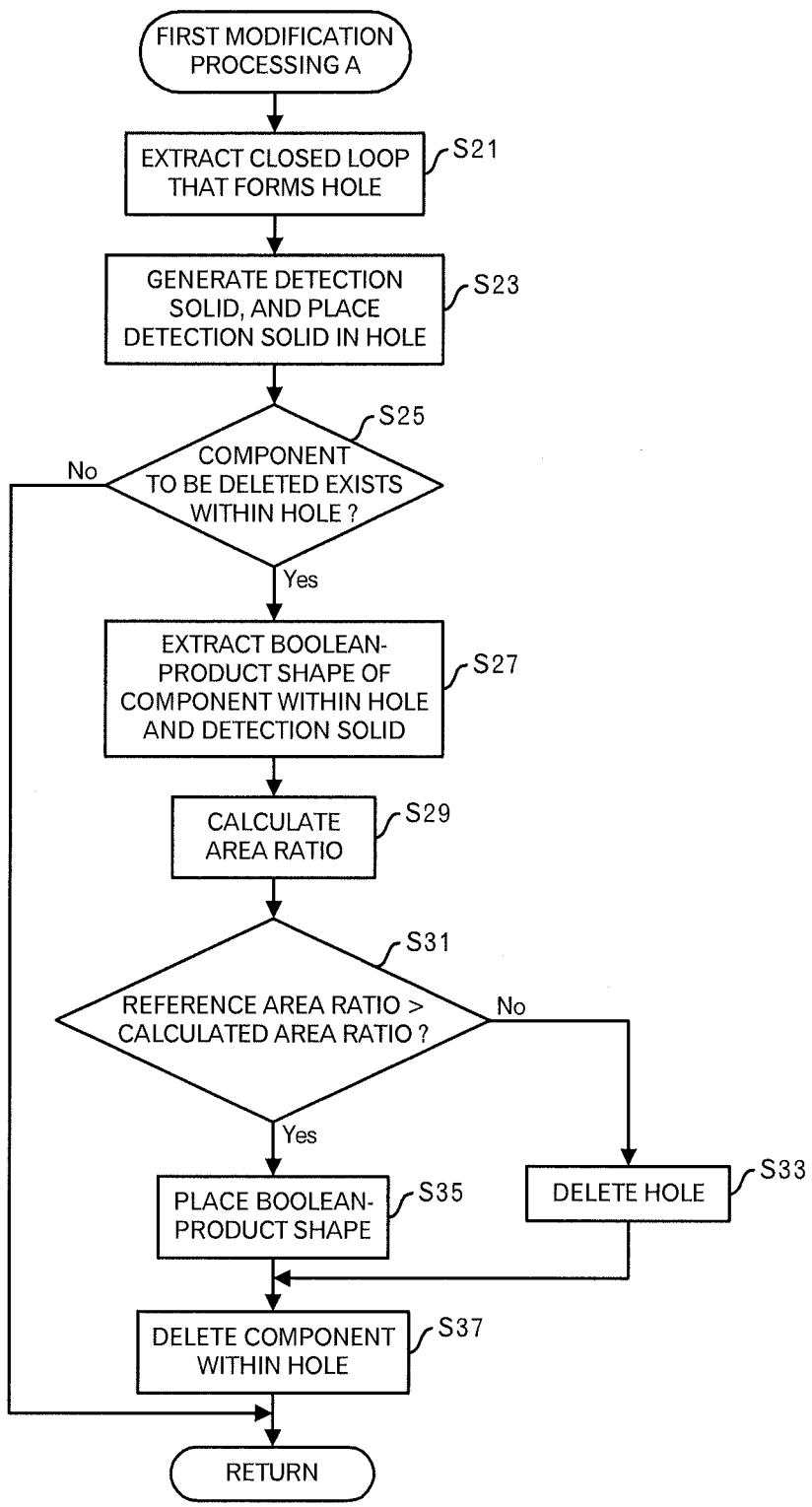
FIG. 4 is a diagram depicting a processing flow of a first modification processing.
Figure 6:
FIG. 6 is a perspective view depicting a closed loop extracted from the hole.
Figure 7:
FIG. 7 is cross section view depicting a state in which a detection solid is placed within the hole.

This first modification processing will be explained using FIGS. 4 to 13. First, the extraction unit 107 extracts a closed loop that forms the hole, and stores data of the closed loop into the data storage unit 109 (FIG. 4: step S21). Here, a closed loop as depicted in FIG. 6 is extracted from the hole A depicted in FIG. 5. FIG. 6 depicts a side of the cylindrical having no top surface and bottom surface, and the curved surface corresponding to the side of the cylindrical forms the closed loop. Then, the extraction unit 107 generates a detection solid based on the extracted closed loop, and updates data of the three-dimensional model, which is stored in the data storage unit 109, so as to represent a state where the detection solid is placed within the hole to be processed in the component to be processed (step S23). The detection solid is a cylindrical that has the same diameter and height as the inside diameter and height of the closed loop depicted in FIG. 6, and is an object that can be placed within the hole to be processed without interfering with the component to be processed. Here, as depicted in FIG. 7, the detection solid 4a is placed within the hole A.

After that, the extraction unit 107 determines whether or not a component that satisfies the condition of the component to be deleted, which was obtained at the step S3, and whose at least portion exists within the hole to be processed exists among other components included in the three dimensional model (step S25). Specifically, it is determined whether or not the detection solid interferes with other components. For example, in case of the solid model, it is possible to carry out interference judgment between shapes, because the phase information representing the connection relationship of the surfaces is included in the data of the solid model. When it is determined that there is no interference with other components, the extraction unit 107 discards the detection solid, and ends the first modification processing. Then, the processing returns to the processing of FIG. 2. On the other hand, when it is determined that there is interference with other components, the extraction unit 107 generates data of the shape represented by the boolean-product of other component having the interference with the detection solid and the detection solid, and stores the data of the generated shape into the data storage unit 109 (step S27). For example, in case of the solid model, it is possible to carry out the boolean operation of the shapes.

Figure 8:
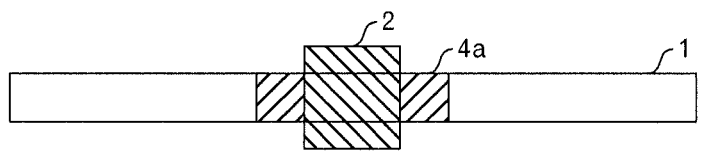
FIG. 8 is a cross section view to explain an interference with other component and detection solid.
Figure 9:
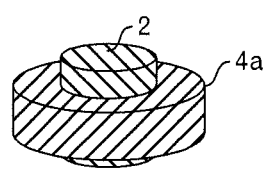
FIG. 9 is a perspective view to explain an interference with other component and detection solid.
Figure 10:
FIG. 10 is a perspective view to explain a boolean-product shape.
Figure 11:
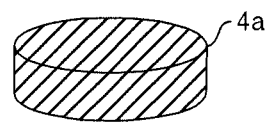
FIG. 11 is a perspective view to explain the detection solid.

In addition, the extraction unit 107 may store data for identifying the hole and data for identifying other component having the interference with the hole into the data storage unit 109. For example, the data for identifying other component having the interference with the hole may be geometrical data representing the component (e.g. at least a part of vertexes, ridge lines and curved surface), coordinates of at least one point within the component, or identification information of the component, which is included in the design data. Similarly, the data for identifying the hole may be geometrical data of the hole, coordinates of a point within the hole, or identification information of the hole, which is stored in the design data storage unit 101 or the like. The output unit 117 may generate data to emphasize the identified hole, based on the data stored in the data storage unit 109, show the generated data to the user through a display device or the like, and cause the user to designate whether or not the hole is to be modified. In such a case, other component may be shown simultaneously. Here, it is assumed that the interference of the detection solid 4a and other component 2 is detected as depicted in FIG. 8 at the step S25, and a boolean-product shape 5a as depicted in FIG. 10 is generated from the shapes interfering with each other as depicted in FIG. 9 at the step S27.

After that, the area ratio calculation unit 111 calculates areas of the top surface or bottom surface of the detection solid and boolean-product shape, and also calculates a ratio of the area of the top surface or bottom surface of the boolean-product shape to the area of the top surface or bottom surface of the detection solid (step S29). The calculated ratio is stored in the data storage unit 109, for example. Incidentally, the area of the top surface or bottom surface of the detection solid in this specific example is an area of the opening portion of the hole. Then, at the step S29, a ratio of a portion covered by other component to the opening portion is calculated. Here, the first area of the top surface of the detection solid 5a depicted in FIG. 11 and second area of the top surface of the boolean-product shape 4a depicted in FIG. 10 are calculated, and the ratio of the second area to the first area are calculated. When the area of the top surface of the boolean-product shape is different from the area of the bottom surface of the boolean-product shape, the smaller area may be employed. In such a case, the area of the covered portion is not evaluated too much.

Figure 12:
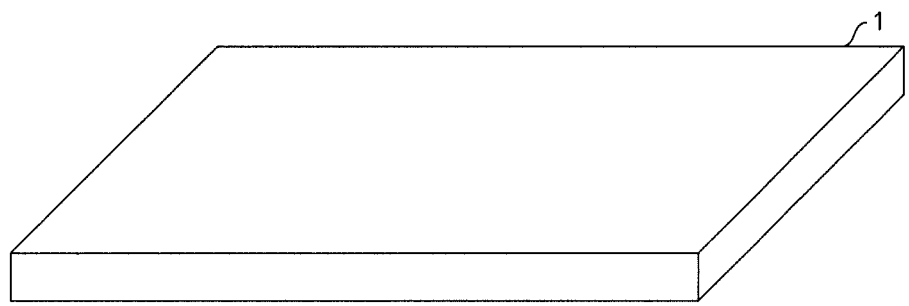
FIG. 12 is a perspective view to explain the deletion of the hole.

After that, the modification unit 113 obtains a reference area ratio from the condition storage unit 103, and determines whether or not the area ratio calculated at the step S29 is less than the reference area ratio (step S31). In this embodiment, the reference area ratio is a threshold for determining whether or not the hole should be deleted, and when the area ratio is less than the reference area ratio, it is presumed that the influence to the numerical analysis is large when the hole itself is deleted. When the calculated area ratio is equal to or greater than the reference area ratio, the modification unit 113 deletes the hole to be processed from the component to be processed, and updates data of the three-dimensional model, which is stored in the data storage unit 109, by data of the component that does not have the hole to be processed (step S33). After that, the processing shifts to step S37. Here, the hole A depicted in FIG. 5 is deleted, as depicted in FIG. 12. Incidentally, the boolean-product shape is discarded.

Figure 13:
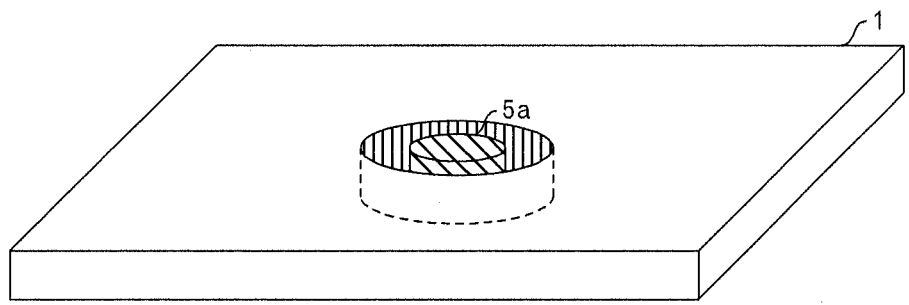
FIG. 13 is a perspective view to explain disposition of a solid into a portion of the hole.
Figure 14:
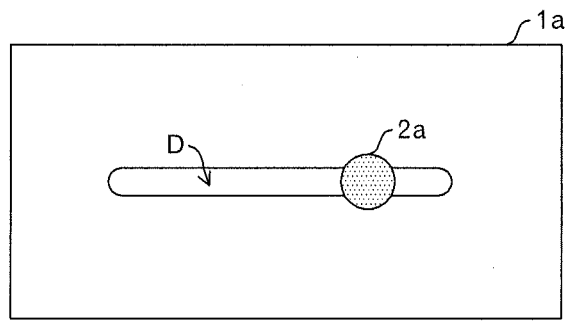
FIG. 14 is a plane figure to explain an example when the solid is placed in a portion of the hole.

On the other hand, when the calculated area ratio is less than the reference area ratio, the modification unit 113 updates data of the three-dimensional model, which is stored in the data storage unit 109, so as to represent a state in which the boolean-product shape is placed within the hole to be processed in the component to be processed (step S35). Here, as depicted in FIG. 13, the boolean-product shape is placed in the portion covered or closed by other component within the hole. FIG. 14 illustrates another example that a certain component is represented by a plane figure. In FIG. 14, a screw 2a exists in part of a hole D that is long and narrow, rectangular and whose edges are rounded. In such a shape, when the numerical analysis of the air flow is carried out, the screw 2a is a component whose size does not influence the analysis result even when it is deleted. However, the area ratio of the cross section of the screw 2a to the opening surface of the hole D is small, and the deletion of the hole D affects the analysis result In such a case, when the boolean-product shape is placed at the step S35, and the screw 2a is deleted at the following step, it is possible to obtain the three-dimensional model enabling to reduce the calculation amount of the numerical analysis while suppressing the influence to the analysis result.

After the step S33 or S35, the processing shifts to step S37, and the modification unit 113 deletes data of other component whose portion exists within the hole to be processed, in the data of the three-dimensional model, which is stored in the data storage unit 109 (step S37). After that, the detection solid placed at the step S23 is discarded, and the first modification processing ends. Then, the processing returns to the processing of FIG. 2.

Returning to the explanation of FIG. 2, the extraction unit 107 determines whether or not the hole to be processed, which was identified at the step S5, exists (step S8). When the hole to be processed is deleted in the first modification processing, the processing shifts to step S11. When at least a portion of the hole to be processed exists, the extraction unit 107 carries out a second modification processing using the hole as the hole to be processed in this processing (FIG. 2: step S9). This second modification processing will be explained by using FIGS. 15 to 22.

Figure 15:
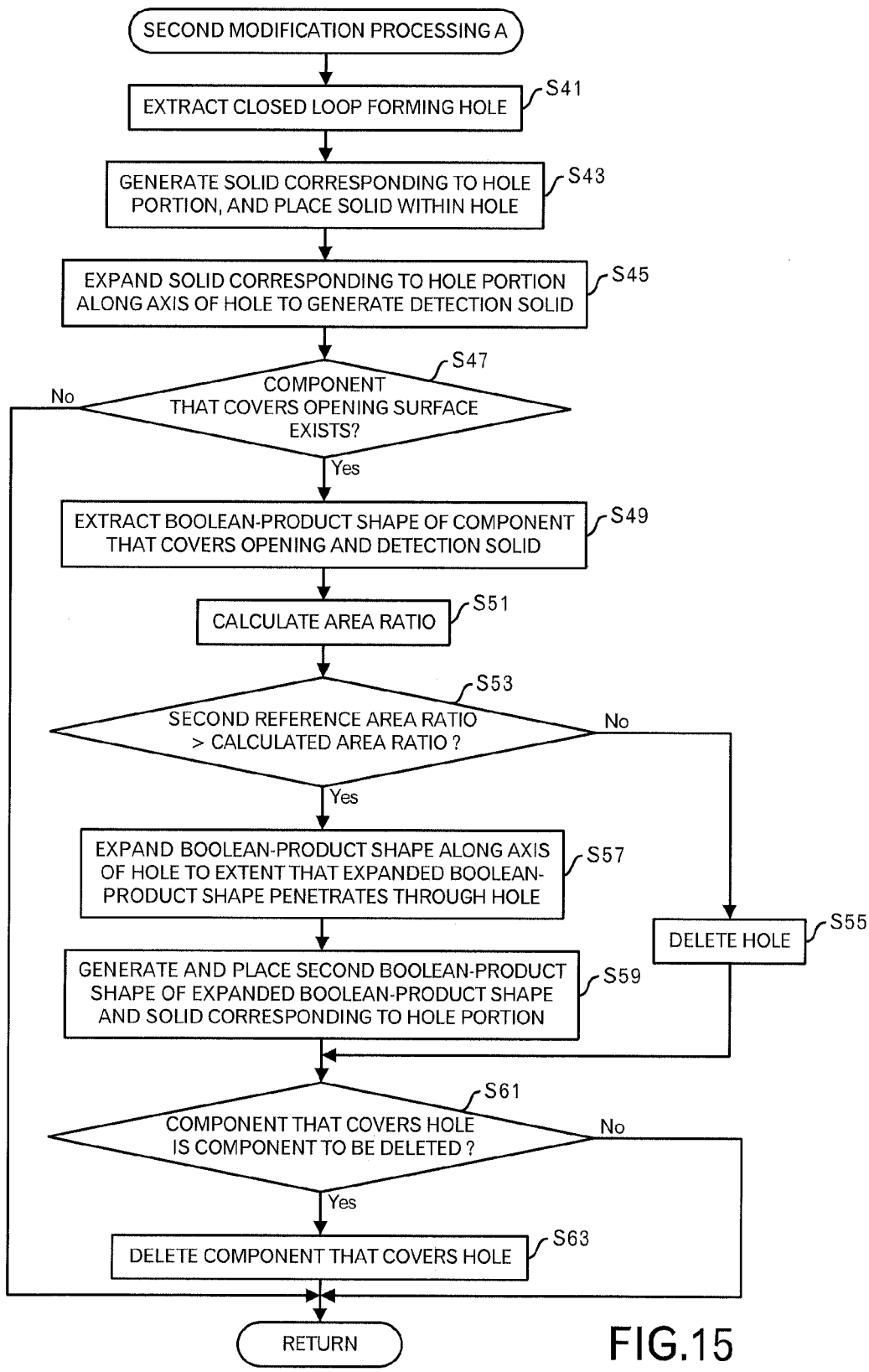
FIG. 15 is a diagram depicting a processing of a second modification processing.

First, the extraction unit 107 extracts a closed loop that forms the hole, from the component to be processed, and stores data of the extracted closed loop into the data storage unit 109 (FIG. 15: step S41). Then, the extraction unit 107 generates data of a shape corresponding to the hole based on the extracted closed loop, and updates the data of the three-dimensional model, which is stored in the data storage unit 109, so as to represent a state in which the generated shape is placed within the hole to be processed in the component to be processed (step S43). Because the processing at the steps S41 and S43 is substantially the same as the processing at the steps S21 and S23 (FIG. 3), data of the shape corresponding to the hole in the first modification processing may be stored in the data storage unit 109 to use the data in the second modification processing.

Figure 16:
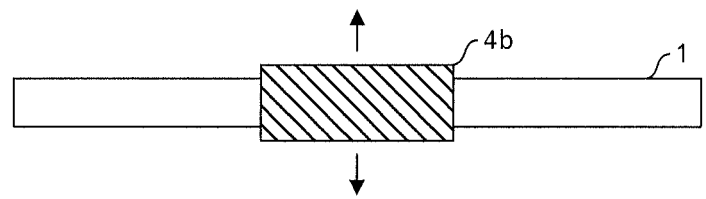
FIG. 16 is a cross section view to explain expansion of a shape corresponding to the hole.

Then, the extraction unit 107 obtains a parameter for adjusting a detection range from the condition storage unit 103, and generates an expanded shape that is formed by expanding the shape corresponding to the hole along an axis of the hole according to the parameter, in addition to the shape corresponding to the hole (step S45). The expanded shape is used later as a detection solid for determining whether or not other component that covers or closes the hole exists, by determining whether or not the interference with other component exists. Moreover, the extraction unit 107 updates the data of the three-dimensional model, which is stored in the data storage unit 109, so as to represent a state in which the detection solid is placed within the hole to be processed. Here, the parameter such as an expansion ratio or a length to be expanded, which is set by the user in advance, is obtained, and as depicted in FIG. 16, the shape corresponding to the hole is expanded according to the parameter. Depending on the setting of the parameter, other component away from the component to be processed to some degree is also detected.

After that, the extraction unit 107 determines whether or not other component included in the three-dimensional model covers at least a part of the hole to be processed (step S47). Specifically, it is determined whether or not the detection solid interferes with other component. When it is determined that there is no interference with other components, the extraction unit 107 discards the shape corresponding to the hole and detection solid. The second modification processing ends, and the processing returns to the processing of FIG. 2. For example, when the component 2 (FIG. 3) has been deleted in the first modification processing, it is determined that there is no other component that covers the hole A.

Figure 17:
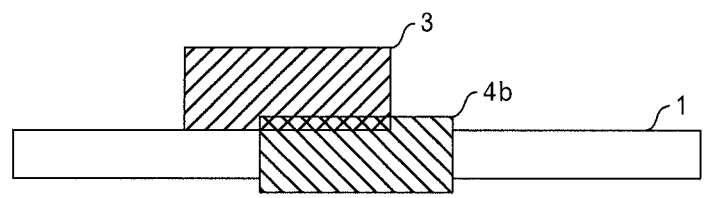
FIG. 17 is a cross section to explain an interference of the detection solid and other component.
Figure 18:
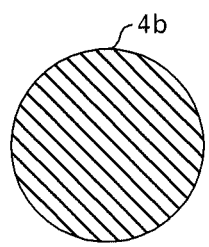
FIG. 18 is a plane figure depicting the detection solid.
Figure 19:
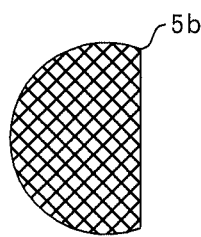
FIG. 19 is a plane figure depicting the boolean-product shape.

On the other hand, when it is determined that the detection solid interferes with other component, the extraction unit 107 generates data of a shape represented by a boolean-product of the detection solid and other component, and stores the generated data into the data storage unit 109 (step S49). Incidentally, similarly to the step S27 (FIG. 4), the information for identifying the hole and other component may be held, and by showing the information to the user, it may be determined whether the modification is should be carried out. Here, it is assumed that, as an example of the hole B depicted in FIG. 3, it is determined whether or not the component 3 interferes with the detection solid 4b as depicted in FIG. 17. Then, the boolean-product shape as depicted in FIG. 19 as a plane figure is generated for the detection solid as depicted in FIG. 18 as a plane figure.

After that, the area ratio calculation unit 111 calculates areas of the top surface or bottom surface of the detection solid and boolean-product shape, which are stored in the data storage unit 109, and also calculates a ratio of the area of the top surface or bottom surface of the boolean-production shape to the area of the top surface or bottom surface of the detection solid (step S51). Here, a ratio of the area of the top surface of the boolean-product shape 5b depicted in FIG. 19 to the area of the top surface of the detection solid 4b depicted in FIG. 18 is calculated, for example. The calculated ratio is stored into the data storage unit 109.

Then, the modification unit 113 obtains a second reference area ratio from the condition storage unit 103, and determines whether or not the area ratio calculated at the step S51 is less than the second reference area ratio (step S53). The reference area ratio is a threshold in the second modification processing, and may be the same value as that in the first modification processing. When the calculated area ratio is equal to or greater than the second reference area ratio, the modification unit 113 deletes the hole to be processed from the component to be processed, and updates data of the three-dimensional model, which is stored in the data storage unit 109, by data of the component that does not have the hole (step S55). After that, the processing shifts to the processing of step S61.

Figure 20:
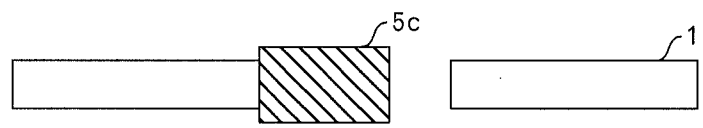
FIG. 20 is a cross section view to explain disposition of an expanded boolean-product shape.
Figure 21:
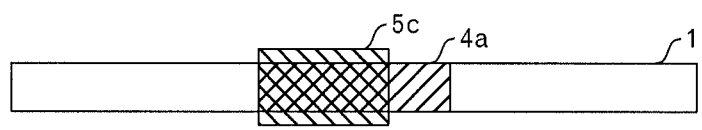
FIG. 21 is a cross section view to explain a boolean-product shape of the expanded boolean-product shape and the shape corresponding to the hole.
Figure 22:
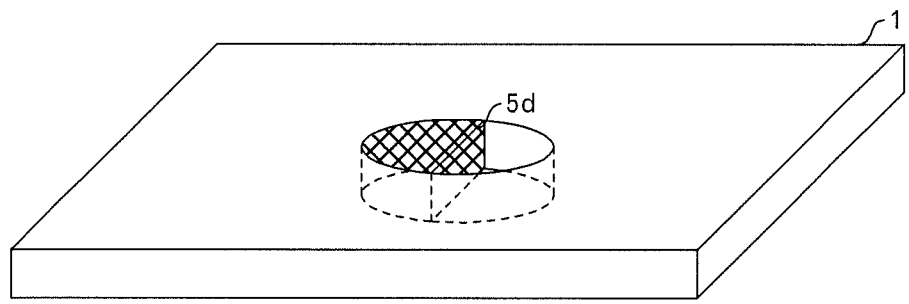
FIG. 22 is a perspective view to explain a processing to bury a portion covered by other component within the hole.

On the other hand, when the calculated area ratio is less than the second reference area ratio, the modification unit 113 expands the boolean-product shape along an axis of the hole so as to make the height of the boolean-product shape equal to or greater than the depth of the hole to be processed, and updates the data of the three-dimensional model, which is stored in the data storage unit 109, so as to represent a state in which the expanded boolean-product shape is placed within the hole to be processed in the component to be processed (step S57). For example, the height of the boolean-product shape is lengthened so as to be a value calculated by multiplying the depth of the hole by a predetermined value or adding a predetermined value to the depth of the hole. This predetermined value may be stored in the condition storage unit 103 as a parameter set by the user. Here, as depicted in FIG. 20, the expanded boolean-product shape 5c is placed. Then, the modification unit 113 generates a second boolean-product shape of the expanded boolean-product shape and the shape corresponding to the hole, and updates the data of the three-dimensional model, which is stored in the data storage unit 109, so as to represent a state in which the generated second boolean-product shape is placed within the hole to be processed in the component to be processed (step S59). Here, as depicted in FIG. 21, a second boolean-product shape 5d of the shape 4a corresponding to the hole and the expanded boolean-product shape 5c is generated, and as depicted in FIG. 22, the generated second boolean-product shape 5d is placed with in the hole to be processed. The generated second boolean-product shape is a shape to bury a portion covered by other component in the hole to be processed. When such a shape is placed, even if other component that covers the hole to be processed is deleted later, this deletion hardly influences the result of the numerical analysis. In addition, when other component that covers the hole to be processed is not deleted, the difference formed by other component and the side of the hole is buried, and an excessively detailed portion that hardly influence the result of the numerical analysis is simplified.

After the step S55 or S59, the modification unit 113 obtains a condition of the component to be deleted, which is stored in the condition storage unit 103, and determines whether or not other component that covers the hole to be processed is the component to be deleted (step S61). When other component that covers the hole to be processed is not the component to be deleted, the intermediately generated detection solid is discarded, and the second modification processing ends. Then, the processing returns to the processing in FIG. 2. On the other hand, when other component that covers the hole to be processed is not the component to be deleted, the modification unit 113 deletes data of other component that at least partially covers the hole to be processed in the data of the three-dimensional model, which is stored in the data storage unit 109 (step S63). After that, the intermediately generated detection solid is discarded and the second modification processing ends. Then, the processing returns to the processing of FIG. 2.

Returning to the explanation of the processing in FIG. 2, the extraction unit 107 determines whether or not at least one unprocessed hole that satisfies the condition obtained at the step S3 exists (step S11). When at least one unprocessed hole that satisfies the condition exists, the processing returns to the step S5. Incidentally, when the hole C depicted in FIGS. 3A and 3B has not been processed, the processing returns to the step S5. After that, because the hole C satisfies the condition obtained at the step S3, the hole C is extracted at the step S5. However, because other component having a portion within the hole C or other component that at least partially covers the hole C does not exist, the hole C is not modified and remains as it is. When there is no unprocessed hole that satisfies the condition, the extraction unit 107 determines whether or not the unprocessed component having a hole exists (step S13). When there is at least one unprocessed component having a hole, the processing returns to the step S4. When there is no unprocessed component having a hole, the modification unit 113 reads out the data of the three-dimensional model, which is stored in the data storage unit 109, and stores the read data into the modified three-dimensional model storage unit 115 (step S15), and then the processing ends.

When the aforementioned processing is carried out, it is possible to modify the hole and component that hardly influence the result of the numerical analysis, based on the detailed three-dimensional model in the design data. Especially, in the numerical analysis of the air flow, in which a spacial aperture between components affects the analysis result, the three-dimensional model that is capable of reducing the calculation amount while suppressing the influence to the analysis result can be obtained.

Moreover, even in case where the modification of the hole is not automatically carried out, when the holes that may be modification candidates are shown to the user, it is possible to support the modification task of the three-dimensional model by the user. Data of the processing results, data being processed, conditions set in advance and the like are displayed on the display device through the output unit 117 in order to show those data to the user.

Incidentally, even if the order of the first modification processing and second modification processing is exchanged, almost the same three-dimensional data is obtained. In addition, the design data storage unit 101 may be other storage apparatus connected through a network to the three-dimensional model processing apparatus relating to this embodiment, or may be a computer-readable removable medium.

Figure 23:
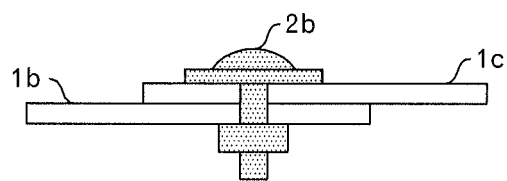
FIG. 23 is a cross section view to explain an example when one component exists within plural holes.

In the aforementioned specific example, there is one component within the hole or one component that covers the opening portion of the hole for one hole. However, as depicted in FIG. 23, there is a case where one component exists within plural holes. In FIG. 23, the components 2b (bolt, nut and washer, which are hatched) fix the components 1b and 1c. Incidentally, it is assumed that the bolt, nut and washer are set as one unit of the components to be deleted. In this embodiment, firstly, when the component 1b is identified as a component to be processed, the hole in which the component 2b exists is deleted and the component 2b is also deleted. Accordingly, the modified component 1b covers the hole of the component 1c. Then, when the component 1c is identified as a component to be processed, the hole of the component 1c is deleted, and the component 1b not to be deleted remains as it is. Instead of such a method, the hole of the component 1b and hole of the component 1c may be processed as one hole. Reversely, when plural other components exist within one hole, or when the opening portion of the hole is covered by plural other components, the area ratio may be calculated at the aforementioned steps S29 and S51 by using an area calculated by adding areas covered by the plural other components.

[Variations of the Modification Processing]

The aforementioned first modification processing and second modification processing may be transformed as described below. First, a variation of the first modification processing will be explained by using FIGS. 24 to 26.

Figure 24:
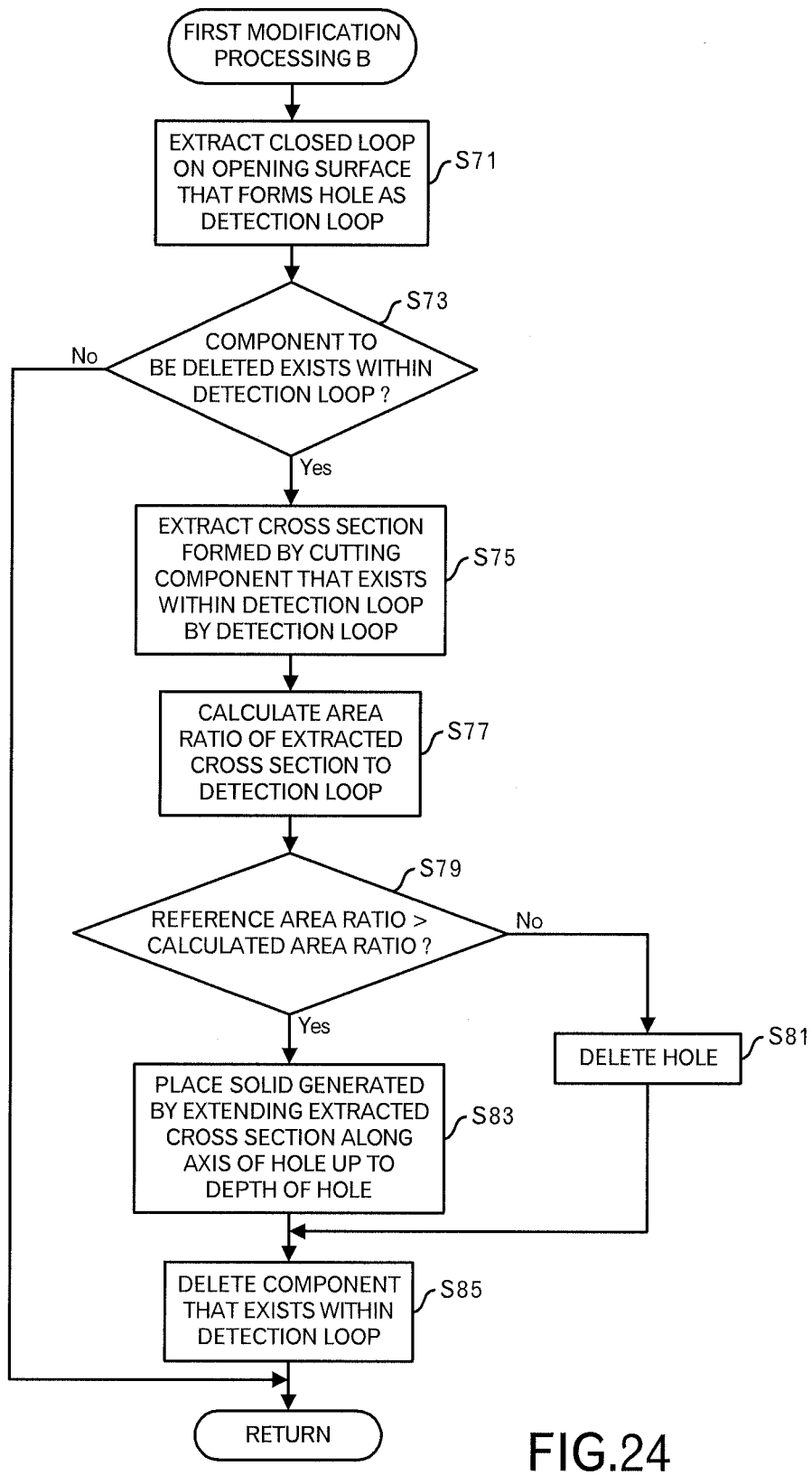
FIG. 24 is a diagram depicting a processing flow of a variation of the first modification processing.
Figure 25:
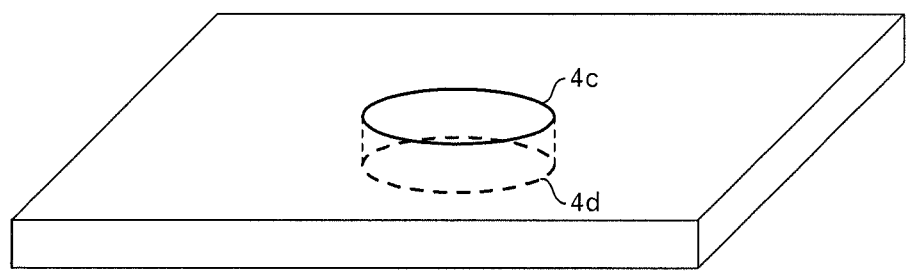
FIG. 25 is a perspective view to explain a detection loop.

FIG. 24 depicts a processing flow of the variation of the first modification processing. First, the extraction unit 107 extracts a closed loop on an opening surface that forms a hole, and generates a detection loop from the closed loop (FIG. 24: step S71). Moreover, the extraction unit 107 updates the data of the three-dimensional model, which is stored in the data storage unit 109, so as to represent a state in which the detection loop is placed at the opening portion of the hole to be processed. Here, as depicted in FIG. 25, the detection loops 4c and 4d corresponding to the shape of the opening portion of the hole are placed in addition to the shape of the hole.

Figure 26:
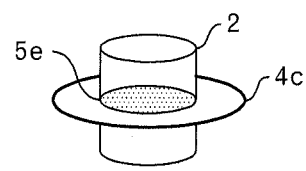
FIG. 26 is a perspective view to explain a component within the detection loop and its cross section.

After that, the extract ion unit 107 determines whether or not a component that satisfies the condition of the component to be deleted, which was obtained at the step S3, and exists within the detection loop exists (step S73). When it is determined that the component that satisfies the condition of the component to be deleted and exists within the detection loop does not exist, the extraction unit 107 discards the detection loop and the first modification processing B ends. Then, the processing returns to the processing of FIG. 2. On the other hand, when it is determined that the component that satisfies the condition of the component to be deleted and exists within the detection loop exists, the extraction unit 107 extracts a cross section generated by cutting the component by a plane passing through the detection loop, and updates the data of the three-dimensional model, which is stored in the data storage unit 109, so as to represent a state in which the cross section is placed at the hole to be processed (step S75). In addition, the extraction unit 107 may store information for identifying the hole and the component into the data storage unit 109. Here, at the step S73, the component 2 that exists within the detection loop 4c is detected as depicted in FIG. 26, and at the step S75, the cross section 5e is extracted.

After that, the area ratio calculation unit 111 calculates an area within the detection loop, which is stored in the data storage unit 109, and an area of the extracted cross section, and also calculates a ratio of the area of the extracted cross section to the area within the detection loop (step S77). The calculated ratio is stored into the data storage unit 109, for example. Also here, when plural cross sections having the different area are extracted from the detection loops 4c and 4d depicted in FIG. 25, the smaller area may be employed. In such a case, the ratio of the covered portion is not evaluated too much.

After that, the modification unit 113 obtains a reference area ratio from the condition storage unit 103, and determines whether or not the area ratio calculated at the step S77 is less than the reference area ratio (step S79). Then, when the calculated area ratio is equal to or greater than the reference area ratio, the modification unit 113 deletes the hole to be processed from the component to be processed, and updates the data of the three-dimensional model, which is stored in the data storage unit 109, by the data of the component in which the hole is deleted (step S81). After that, the processing shifts to step S85.

On the other hand, when the calculated area ratio is less than the reference area ratio, the modification unit 113 generates a solid that is formed by extending the extracted cross section along the axis of the hole so that the height of the solid becomes the depth of the hole, and updates the data of the three-dimensional model, which is stored in the data storage unit 109, so as to represent a state in which the solid is placed within the hole to be processed (step S83). Here, the same solid as depicted in FIG. 13 is placed.

After the step S81 or S83, the processing shifts to the step S85, and the modification unit 113 deletes data of other component whose portion exists within the hole to be processed in the data of the three-dimensional model, which is stored in the data storage unit 109 (step S85). After that, the intermediately generated detection loop and the like are discarded, and the first modification processing B ends, and the processing returns to the processing of FIG. 2.

Figure 27:
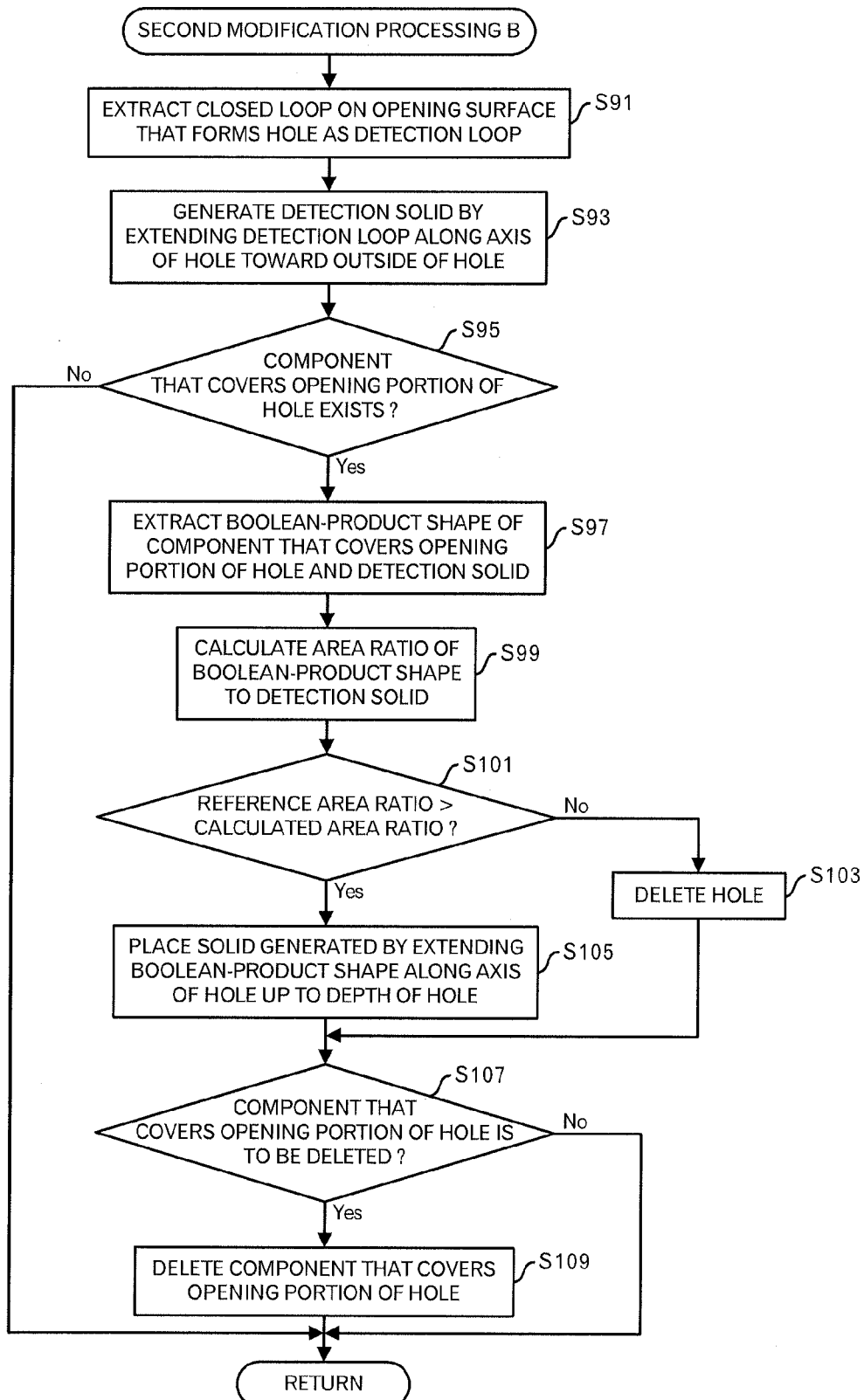
FIG. 27 is a diagram depicting a processing flow of a variation of the second modification processing.
Figure 28:
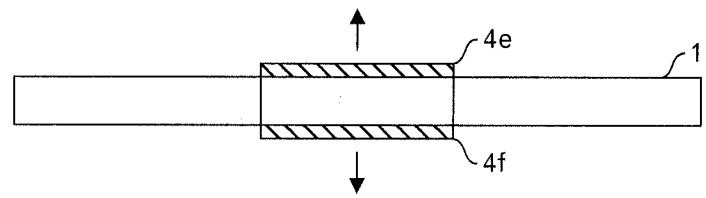
FIG. 28 is a cross section figure to explain prolonging the detection loop.
Figure 29:
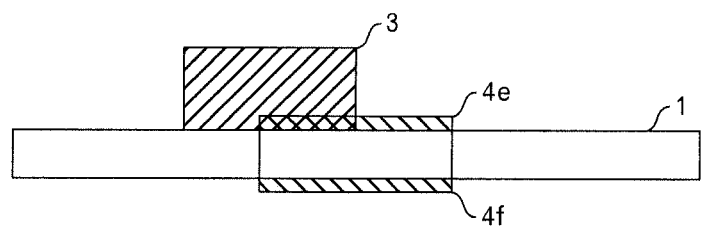
FIG. 29 is a perspective view to explain an interference of the detection solid and other component.

Next, a variation of the second modification processing will be explained by using FIGS. 27 to 29. First, FIG. 27 depicts a processing flow relating to the variation of the second modification processing. The extraction unit 107 firstly extracts a closed loop on the opening surface that forms the hole as the detection loop, and stores data representing the detection loop into the data storage unit 109 (FIG. 27: step S91).

After that, the extraction unit 107 generates a region whose outer edge is the detection loop. Then, the extraction unit 107 obtains a parameter for adjusting the detection range from the condition storage unit 103, and generates a detection solid formed by extending the generated region along the axis of the hole, toward the outside of the hole and according to the parameter (step S93). After that, the data of the three-dimensional model, which is stored in the data storage unit 109, is updated so as to represent a state in which the detection solid is placed from the opening portion of the hole to be processed toward the outside. Here, as depicted in FIG. 28, the detection solid is placed.

After that, the extraction unit 107 determines whether or not other component included in the three-dimensional model covers at least a part of the hole to be processed (step S95). Specifically, it is determined whether or not the detection solid interferes with other component. When it is determined that the detection solid does not interfere with other component, the intermediately generated detection solid is discarded, and the second modification processing B ends, and the processing returns to the processing of FIG. 2.

On the other hand, when it is determined that the detection solid interferes with other component, the extraction unit 107 generates data of a shape represented by a boolean-product of the detection solid and other component, and stores the data representing the boolean-product shape into the data storage unit 109 (step S97). For example, as depicted in FIG. 29, when the detection solid 4e interferes with the component 3, a shape of an overlapping portion is generated. Moreover, the extraction unit 107 may store information for identifying the hole and other component in the data storage unit 109.

After that, the area ratio calculation unit 111 calculates an area within the detection loop, which is stored in the data storage unit 109, and area of the top surface or bottom surface of the boolean-product shape, and calculates a ratio of the area of the top surface or bottom surface of the boolean-product shape to the area within the detection loop (step S99). Instead of the area within the detection loop, the area of the top surface or bottom surface of the detection solid may be used to calculate the same ratio.

Then, the modification unit 113 obtains a second reference area ratio from the condition storage unit 103, and determines whether or not the area ratio calculated at the step S99 is less than the second reference area ratio (step S101). When the calculated area ratio is equal to or greater than the second reference area ratio, the modification unit 113 deletes the hole to be processed from the component to be processed, and updates the data of the three-dimensional model, which is stored in the data storage unit 109, by the data of the component in which the hole is deleted (step S103). After that, the processing shifts to the processing of step S107.

On the other hand, when the calculated area ratio is less than the second reference area ratio, the modification unit 113 generates a solid that is formed by extending the boolean-product shape along the axis of the hole so that the height of the boolean-product shape becomes the depth of the hole to be processed. Then, the modification unit 113 places the generated solid within the hole to be processed, and updates the data of the three-dimensional model, which is stored in the data storage unit 109, so as to represent a state in which the solid is placed within the hole to be processed in the component to be processed (step S105). Here, the solid as depicted in FIG. 22 is placed.

After the step S103 or S105, the modification unit 113 obtains the condition of the component to be deleted from the condition storage unit 103, and determines whether or not other component that covers the hole to be processed is the component to be deleted (step S107). When other component that covers the hole to be processed is not the component to be deleted, the intermediately generated detection solid is discarded and the second modification processing B is terminated, and the processing returns to the processing of FIG. 2. On the other hand, when other component that covers the hole to be processed is the component to be deleted, the modification unit 113 deletes data of component that at least partially covers the hole to be processed, in the data of the three-dimensional model, which is stored in the data storage unit 109 (step S109). After that, the intermediately generated detection loop and detection solid are discarded, the second modification processing B ends, and the processing returns to the processing of FIG. 2.

Thus, even when the detection loop corresponding to the opening portion of the hole is employed, the similar modification processing can be executed. In this case, data associated with the processing may be outputted through the output unit 117 to show the data to the user.

In addition, the order of the first modification processing B and second modification processing B may be exchanged, and the aforementioned embodiment and variation may be combined.

Figure 30:
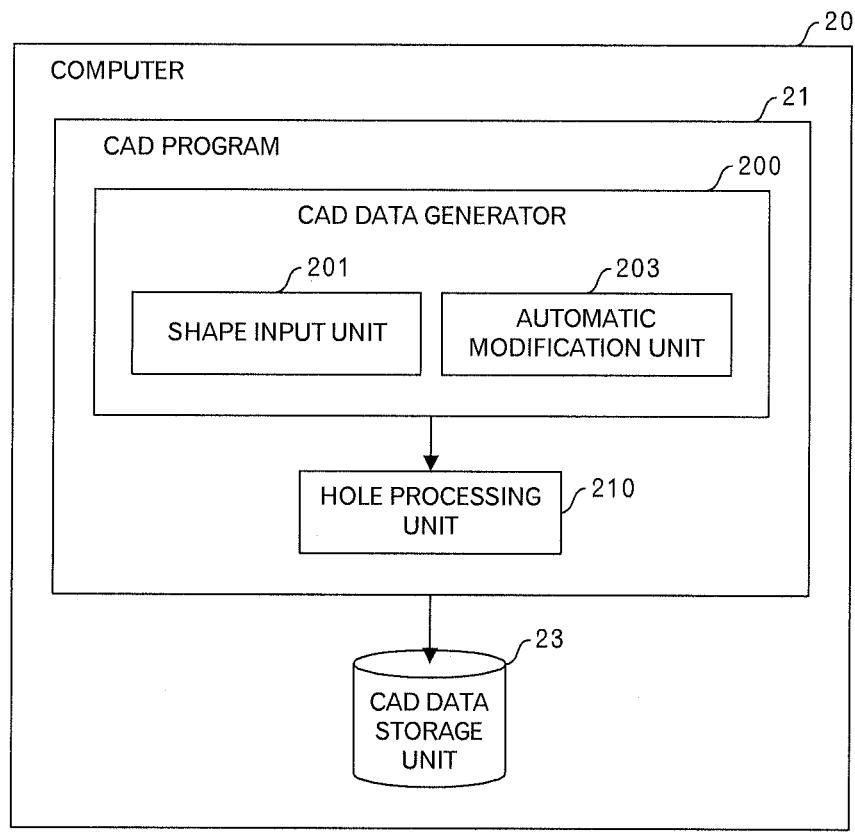
FIG. 30 is a functional block diagram of a computer that executes a CAD program.

Although the embodiment and variation of the three-dimensional model processing apparatus were explained above, the processing for the three-dimensional model, which is executed by the three-dimensional model processing apparatus, may be combined into a CAD program or numerical analysis program. Here, FIG. 30 depicts an example of a computer that executes the CAD program to which the processing of the three-dimensional model is integrated. A computer 20 depicted in FIG. 30 has a CAD data storage unit 23, and executes the CAD program 21. In addition, when being executed, the CAD program 21 functions as a CAD data generator 200 for generating the design data and the like, and hole processing unit 210, which relates to this embodiment, for carrying out a processing for the three-dimensional model. Moreover, the CAD data generator 200 has a shape input unit 201 that accepts inputs from the user to process the three-dimensional model, and automatic modification unit 203 that is realized by processing scripts for modifying the three-dimensional model, by the CAD program 21. The CAD program includes a module for causing to execute a processing according to the scripts for automatically modifying the shape, and is used to modify the design data and the like. For example, as for the processing for the aforementioned three-dimensional model, which relates to this embodiment, scripts for carrying out the processing are created, and when the CAD program 21 processes the scripts, the hole processing unit 210 is realized. Moreover, the modified three-dimensional model, which is stored in the CAD data storage unit, may be directly outputted to other computer, numerical analysis unit or the like, in order to cooperate with each other.

Figure 31:
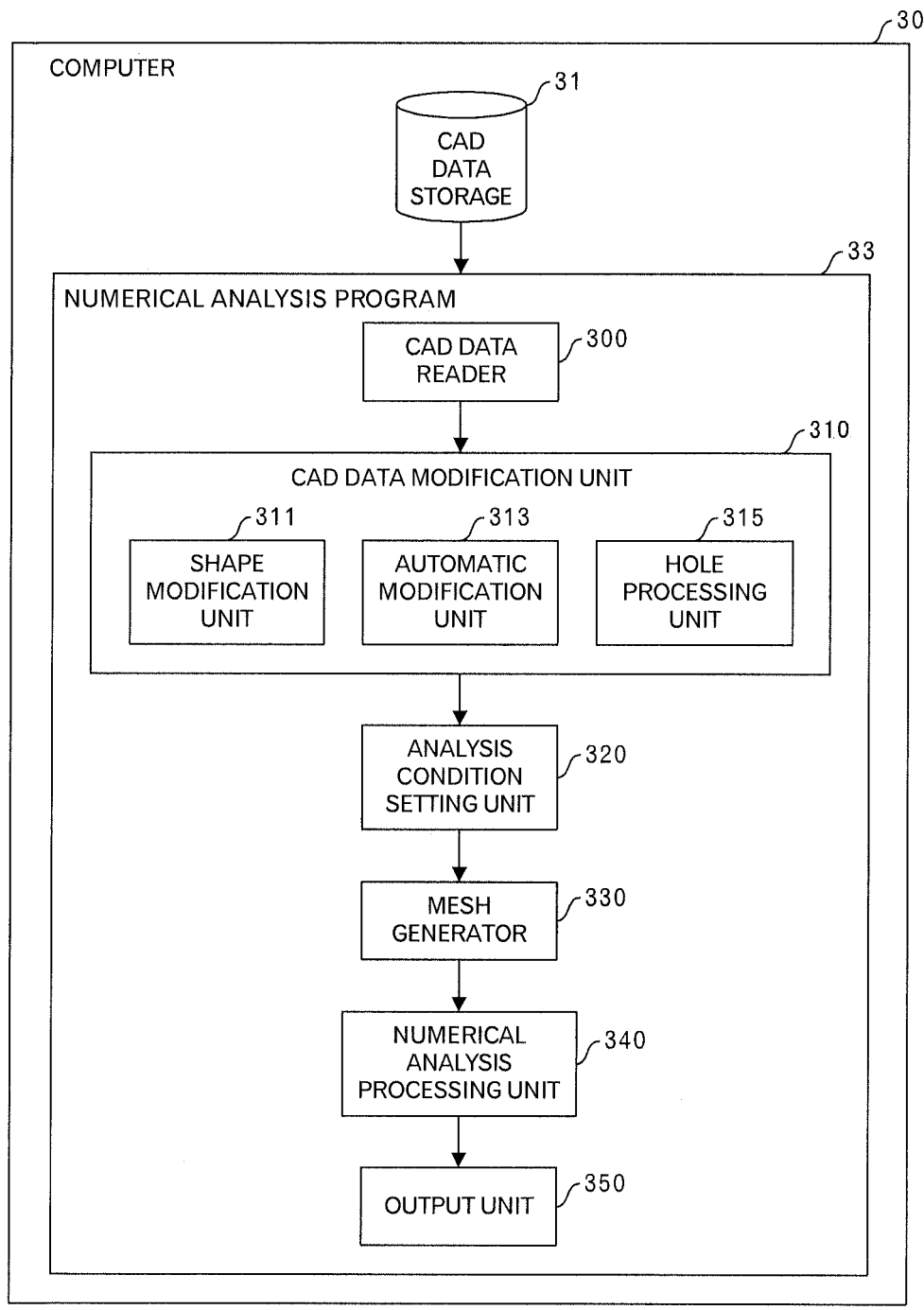
FIG. 31 is a functional block diagram of a computer that executes a numerical analysis program.

In addition, FIG. 31 depicts an example of a computer executing a numerical analysis program into which a module for carrying out a processing for the three-dimensional model, which relates to this embodiment, is incorporated. A computer 30 depicted in FIG. 31 has a CAD data storage unit 31, and executes a numerical analysis program 33. Moreover, when the numerical analysis program 33 is executed, the numerical analysis program 33 functions as a CAD data reader 300, CAD data modification unit 310, analysis condition setting unit 320, mesh generator 330, numerical analysis processing unit 340 and output unit 350. The CAD data modification unit 310 has a shape modification unit 311 that modifies the CAD data according to inputs from the user, automatic modification unit 313 that is realized by processing, by the numerical analysis program 33, the scripts, and hole processing unit 315 that carries out a processing for the three-dimensional model, which relates to this embodiment. Then, the CAD data modification unit 310 generates data used for the numerical analysis by modifying the design data read by the CAD data reader 300. The numerical analysis program also includes a module for causing to carry out a processing according to the scripts for automatically modifying the shape, and is used for the modification of the design data and the like. For example, as for the processing for the three-dimensional model, which relates to this embodiment, the scripts for carrying out the aforementioned processing are created, and when the scripts is processed by the numerical analysis program 33, the hole processing unit 315 is realized. Because the CAD data reader 300, analysis condition setting unit 320, mesh generator 330, numerical analysis processing unit 340 and output unit 350 carry out the same processing as the conventional processing, the detailed explanation is omitted.

Although the embodiments of this technique were explained above, this technique is not limited to those. For example, the functional block diagrams are mere examples, and do not always correspond to an actual program module configuration. In addition, as for the processing flow, as long as the processing result does not change, the order of the steps may be exchanged, and the steps may be executed in parallel.

Figure 32:
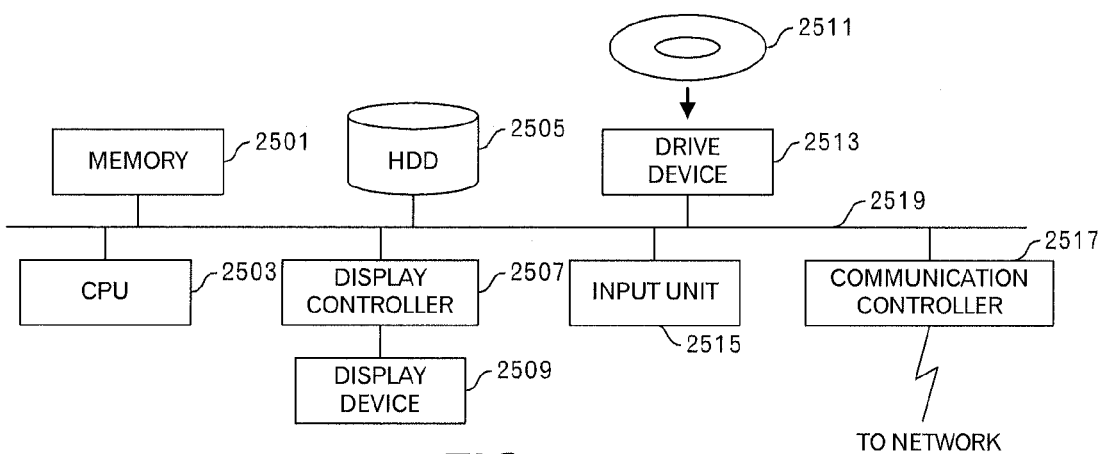
FIG. 32 is a functional block diagram of a computer.

In addition, the three-dimensional model processing apparatus is a computer device as shown in FIG. 32. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 32. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the computer-readable removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

Figure 33:
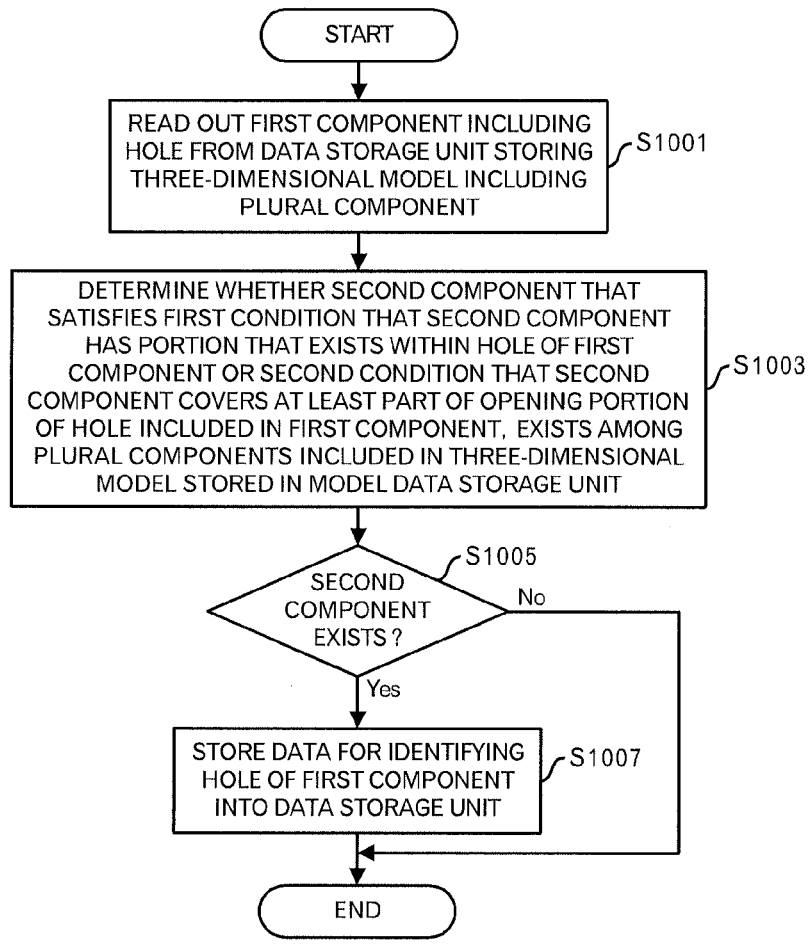
FIG. 33 is a diagram depicting a processing flow of a three-dimensional model processing method.

The aforementioned embodiments are outlined as follows:

A three-dimensional model processing method relating to these embodiments includes: (A) reading out a first component having a hole from a model data storage unit storing a three-dimensional model including a plurality of components (FIG. 33: step S1001); (B) determining whether a second component that satisfies a first condition that the second component has a portion that exists within the hole of the first component or a second condition that the second component covers at least a part of an opening portion of the hole included in the first component exists among the plurality of components included in the three-dimensional model stored in the model data storage unit (FIG. 33: step S1003); and (C) upon determining that the second component exists (FIG. 33: step S1005: Yes route), storing data for identifying the hole of the first component into a data storage unit (FIG. 33: step S1007).

For example, when the numerical analysis of the air flow is carried out, the covered or closed hole hardly affects the analysis result. Therefore, as described above, a hole within which a portion of other component exists or a hole whose at least part of the opening portion is covered by other component, there is possibility that the hole is substantially covered or closed. Then, by carrying out the aforementioned processing, and identifying the hole that may be substantially covered or closed, the modification task of the three-dimensional model is supported as a new viewpoint. Namely, it becomes easy for the user to carrying out the modification task such as showing candidates to select the hole to be deleted or automatically modifying the hole.

In addition, the three-dimensional model processing method relating to these embodiment may further include: (D) calculating a ratio of an area of a cross section obtained by cutting the second component by an opening surface of the hole to an area of the opening portion of the hole identified by the data stored in the data storage unit or a ratio of an area of the part of the opening portion of the hole, which is covered by the second component, to the area of the opening surface of the hole; and (E) upon detecting that the calculated ratio is equal to or greater than a predetermined value, generating data of a shape representing that the hole is deleted from the first component, and storing the generated data into a modified data storage unit. Presuming that there is no aperture affecting the numerical analysis when the area ratio is equal to or greater than the predetermined value, the hole itself is automatically deleted. Accordingly, the modification task of the three-dimensional model is efficiently carried out.

Furthermore, the three-dimensional model processing method relating to these embodiments may further include: (F) upon detecting that the calculated ratio is less than the predetermined value, generating data of a shape representing that the first component is modified by placing, within the hole, a shape corresponding to a portion occupied within the hole by the second component or a shape obtained by extending, within the hole, the part of the opening portion of the hole, which is covered by the second component, along an axis of the hole, and storing the generated data into the modified data storage unit. Even when it is determined that the hole itself cannot be deleted, a shape for filling a portion occupied by a component or a portion covered by a component is placed. Accordingly, such a component can be deleted. In other words, even when such a component is deleted, the size of the portion that substantially opens within the hole does not change, and the first component becomes a shape that hardly affect the numerical analysis.

Furthermore, the aforementioned first condition may include a third condition concerning a component to be deleted, and the third condition may be stored in a condition storage unit. Then, the three-dimensional model processing method according to these embodiments may further include: (G) storing data for identifying the second component satisfying the first condition or the second component satisfying the second and third conditions, into the data storage unit.

By reducing the number of components, it also becomes possible to reduce the calculation amount. Thus, because the first condition further includes the third condition, the second component to be processed at the aforementioned step (B) is narrowed, and the second component satisfying the first condition is also processed during the steps (D) to (F). In other words, because a replacement for the second component is placed in the hole, the second component is deleted after the step (G). On the other hand, the second component satisfying the second condition is processed during the steps (B) to (F) regardless of whether or not the third condition is satisfied, and it is determined at the step (G) whether or not the second component satisfying the second condition satisfies the third condition. Therefore, even when the second component is not a component to be deleted, the first component and its circumference are simplified by burying all of the hole or at least a part of the hole by a shape for resolving a difference between the side of the hole and the second component, which is caused by the second component that partially covers the hole.

Figure 34:
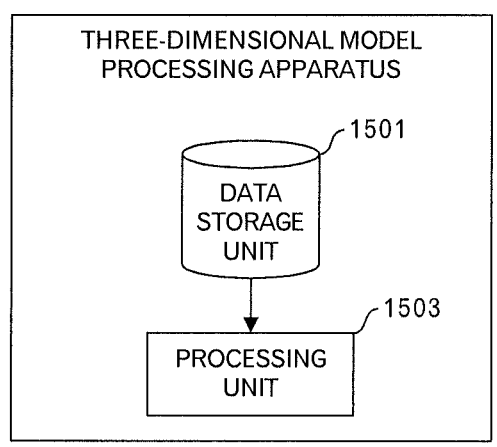
FIG. 34 is a functional block diagram of a three-dimensional model processing apparatus.

A three-dimensional model processing apparatus relating to these embodiments, includes: a data storage unit (FIG. 34: data storage unit 1501); and a processing unit (FIG. 34: 1503) programmed to execute a process comprising: obtaining a first component having a hole among a plurality of components included in a three-dimensional model; determining whether a second component that satisfies a first condition that the second component has a portion that exists within the hole of the first component or a second condition that the second component covers at least a part of an opening portion of the hole included in the first component exists among the plurality of components included in the three-dimensional model; and upon determining that the second component exists, storing data for identifying the hole of the first component into the data storage unit.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process, the process comprising:
obtaining a first component having a hole among a plurality of components included in a three-dimensional model;
determining whether a second component that satisfies a first condition that the second component has a portion that exists within the hole of the first component or a second condition that the second component covers at least a part of an opening portion of the hole included in the first component exists among the plurality of components included in the three-dimensional model;
upon determining that the second component exists, storing data for identifying the hole of the first component into a data storage unit;
calculating a ratio of an area of a cross section obtained by cutting the second component by an opening surface of the hole to an area of the opening portion of the hole or a ratio of an area of the part of the opening portion of the hole, which is covered by the second component, to the area of the opening surface of the hole; and
upon detecting that the calculated ratio is equal to or greater than a predetermined value, generating data of a shape representing that the hole is deleted from the first component.

2. The computer-readable, non-transitory storage medium as set forth in claim 1, wherein the process further comprises:
upon detecting that the calculated ratio is less than the predetermined value, generating data of a shape representing that the first component is modified by placing, within the hole, a shape corresponding to a portion occupied within the hole by the second component or a shape obtained by extending, within the hole, the part of the opening portion of the hole, which is covered by the second component, along an axis of the hole.

3. The computer-readable, non-transitory storage medium as set forth in claim 2, wherein the first condition includes a third condition concerning a component to be deleted, and the process further comprises:
storing data for identifying the second component satisfying the first condition or the second component satisfying the second and third conditions, into the data storage unit.

4. The computer-readable, non-transitory storage medium as set forth in claim 1, wherein the obtaining comprises:
obtaining a first component, which has a hole whose depth is less than a predetermined value, among a plurality of components included in a three-dimensional model.

5. A three-dimensional model processing apparatus, comprising:
a data storage unit; and
a processing unit programmed to execute a process comprising:
obtaining a first component having a hole among a plurality of components included in a three-dimensional model;
determining whether a second component that satisfies a first condition that the second component has a portion that exists within the hole of the first component or a second condition that the second component covers at least a part of an opening portion of the hole included in the first component exists among the plurality of components included in the three-dimensional model;

upon determining that the second component exists, storing data for identifying the hole of the first component into the data storage unit;

calculating a ratio of an area of a cross section obtained by cutting the second component by an opening surface of the hole to an area of the opening portion of the hole or a ratio of an area of the part of the opening portion of the hole, which is covered by the second component, to the area of the opening surface of the hole; and upon detecting that the calculated ratio is equal to or greater than a predetermined value, generating data of a shape representing that the hole is deleted from the first component.

6. A three-dimensional model processing method, comprising:

obtaining, by a computer, a first component having a hole among a plurality of components included in a three-dimensional model;

determining, by the computer, whether a second component that satisfies a first condition that the second component has a portion that exists within the hole of the first component or a second condition that the second component covers at least a part of an opening portion of the hole included in the first component exists among the plurality of components included in the three-dimensional model;

upon determining that the second component exists, storing, by the computer, data for identifying the hole of the first component into a data storage unit;

calculating, by the computer, a ratio of an area of a cross section obtained by cutting the second component by an opening surface of the hole to an area of the opening portion of the hole or a ratio of an area of the part of the opening portion of the hole, which is covered by the second component, to the area of the opening surface of the hole; and upon detecting that the calculated ratio is equal to or greater than a predetermined value, generating, by the computer, data of a shape representing that the hole is deleted from the first component.

* * * * *